(12) United States Patent
Shiohara

(10) Patent No.: US 8,373,885 B2
(45) Date of Patent: Feb. 12, 2013

(54) PRINTER AND IMAGE PROCESSING APPARATUS

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/299,552

(22) Filed: Nov. 18, 2011

(65) Prior Publication Data

US 2012/0062951 A1      Mar. 15, 2012

Related U.S. Application Data

(63) Continuation of application No. 12/849,190, filed on Aug. 3, 2010, now Pat. No. 8,107,113, which is a continuation of application No. 11/546,584, filed on Oct. 10, 2006, now Pat. No. 7,796,289.

(30) Foreign Application Priority Data

| Oct. 7, 2005 | (JP) | 2005-294958 |
| Oct. 7, 2005 | (JP) | 2005-295024 |
| Oct. 7, 2005 | (JP) | 2005-295078 |

(51) Int. Cl.
     *H04N 1/40* (2006.01)
(52) U.S. Cl. .......... 358/1.15; 358/1.9; 358/468
(58) Field of Classification Search .......... 358/1.9, 358/1.15, 2.1, 504, 406, 463–464; 348/220.1; 382/268–269
     See application file for complete search history.

(56) References Cited

U.S. PATENT DOCUMENTS

| 7,113,203 B1 | 9/2006 | Wu et al. |
| 7,388,605 B2 | 6/2008 | Obrador |
| 2001/0050875 A1 | 12/2001 | Kahn et al. |
| 2004/0090539 A1 | 5/2004 | Kim et al. |
| 2004/0095600 A1 | 5/2004 | Nitta et al. |
| 2004/0160631 A1 | 8/2004 | Schlonski et al. |
| 2004/0257449 A1 | 12/2004 | Seki |
| 2005/0076062 A1 | 4/2005 | Sawano |
| 2005/0200733 A1 | 9/2005 | Malvar |

FOREIGN PATENT DOCUMENTS

| EM | 0886241 A2 | 12/1998 |
| EP | 1370058 A2 | 12/2003 |
| JP | 4150148 A | 5/1992 |
| JP | 7175916 A | 7/1995 |
| JP | 11032291 A | 2/1999 |
| JP | 2000115444 A | 4/2000 |
| JP | 2000232618 A | 8/2000 |
| JP | 2002204420 A | 7/2002 |
| JP | 2003259281 A | 9/2003 |
| JP | 2004023791 A | 1/2004 |
| JP | 2004242124 A | 8/2004 |
| JP | 2004304712 A | 10/2004 |
| JP | 2005033468 A | 2/2005 |
| JP | 2005175978 A | 6/2005 |
| JP | 2005176272 A | 6/2005 |

OTHER PUBLICATIONS

"JPEG File Interchange Format". Wikipedia, Aug. 26, 2005. XP002430196.
Canon: "Digital Photo Professional (DPP)". Jul. 18-30, 2004. XP002430195.
Epson: "Epson Stylus Photo R2400". Jun. 23, 2005. XP002430197.
European Search Report dated May 7, 2007.
Microsoft: "How Network Priniting Works". Mar. 28, 2003. XP002430198.

*Primary Examiner* — Thomas D Lee
*Assistant Examiner* — Stephen M Brinich
(74) *Attorney, Agent, or Firm* — Nutter McClennen & Fish LLP; John J. Penny, Jr.; Michael P. Visconti, III

(57) ABSTRACT

An input unit inputs RAW data. An image generating unit generates an image from the RAW data using a demosaicing processing. A print unit that prints the image.

11 Claims, 7 Drawing Sheets

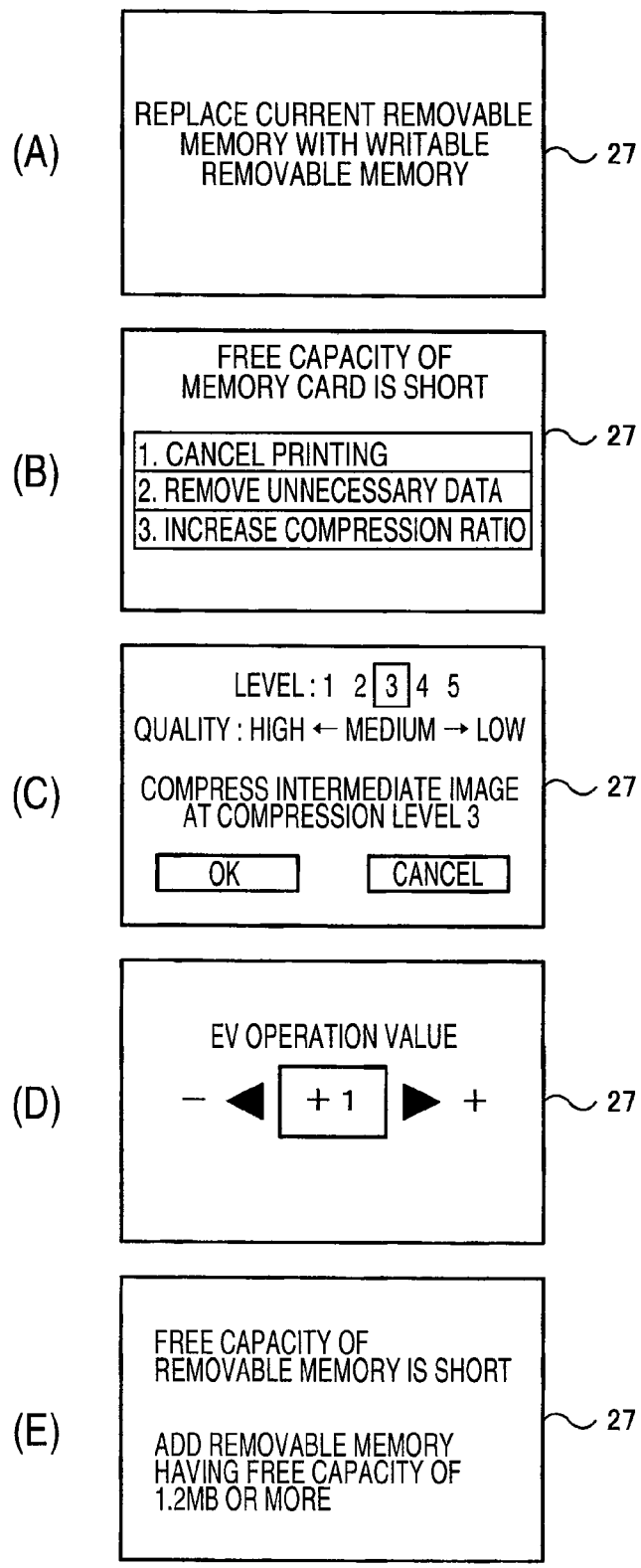

PRINTER AND IMAGE PROCESSING APPARATUS

CROSS-REFERENCE TO RELATED APPLICATIONS

This application is a continuation of U.S. patent application Ser. No. 12/849,190, entitled "Printer and Image Processing Apparatus," filed Aug. 3, 2010 now U.S. Pat. No. 8,107,113, which is a continuation of U.S. patent application Ser. No. 11/546,584, entitled "Printer and Image Processing Apparatus," filed Oct. 10, 2006 now U.S. Pat. No. 7,796,289. Priority under 35 U.S.C. §120 is claimed to both of these applications, and the entire contents of both applications are incorporated herein by reference. This application also claims priority under 35 U.S.C. §119 to Japanese Patent Application Nos. JP 2005-294958, filed in Japan on Oct. 7, 2005, JP 2005-295024, filed in Japan on Oct. 7, 2005, and JP 2005-295078, filed in Japan on Oct. 7, 2005, the entire contents of each of which are incorporated herein by reference.

BACKGROUND OF THE INVENTION

The present invention relates to a printer and image processing apparatus, image processing method and image processing program.

Conventionally, as the data record format of an image input apparatus such as a digital camera, there is known a RAW format in which the pixel data of a color image sensor are digitally recorded as they are (see Japanese Patent Publication No. 2005-33468). Since the color image sensor normally carries thereon color filters respectively for R (Red), G (Green) and B (Blue) for each pixel, the RAW data having only one color component for each pixel are incomplete information as an image representing an object to be printed. Therefore, until a demosaicing processing (which is also referred to as a color falter arrangement interpolation processing), in which at least a color component lacking in each pixel is estimated and interpolated by the color component of a neighboring pixel to thereby generate a color image having three color components for each pixel, are enforced on the RAW data, an image representing the object cannot be printed. In a printer the manufacturing and developing costs of which are restricted severely, there has been urgently needed the development of a technology for printing an image using an RAW data file.

Meanwhile, image processing apparatus, which handle RAW data, has an image generating function which depends on the models of individual digital cameras and uses at least a demosaicing processing, and a function for correcting an image generated by the demosaicing processing. In this type of image processing apparatus, in some cases, there are executed similar processings in a preceding stage up to generation of an image and in a correcting stage after generation of the image. For example, in the preceding stage up to generation of the image, there is executed a sharpness correcting processing for recovering the lowered sharpness due to a low pass filter provided in a digital camera; and in the correcting stage after generation of the image, there are executed a sharpness correcting processing for glossing over the setting errors of focus, stop and shutter speed as well as a sharpness correcting processing according to the print resolution. When these image processings, the objects of which are different but to which the same algorithm for correction is applied, can be executed collectively, the processing time can be shortened. Also, because the image processing essentially involves the deterioration of information, by reducing the number of times the image processings are executed, there is a possibility that the quality of the image can be improved. Further, when a pixel interpolation processing for enhancing the resolution is carried out after execution of a sharpness correcting processing, there is raised a problem that jaggies can appear clearly. Therefore, it is desirable that such sharpness correcting processing prior to execution of the pixel interpolation can be avoided.

SUMMARY OF THE INVENTION

It is therefore an object of the invention to allow a printer, the manufacturing and developing costs of which are severely restricted, to print an image from RAW data.

It is also an object of the invention to provide an image processing apparatus, an image processing method and an image processing program which can optimize the process for generating a final image from RAW data.

(1) In order to achieve the above objects, according to the invention, there is provided a printer, comprising: an input unit that inputs RAW data; an image generating unit that generates an image from the RAW data using a demosaicing processing; and, a print unit that prints the image.

The addition of a function to generate the image from the RAW data using the demosaicing processing to a printer makes it possible for the printer to print the image from the RAW data.

(2) The image generating unit may generate the image of a general-purpose format from the RAW data, and the print unit may print the image of the general-purpose format.

When generating an image from RAW data, by generating an image of a general-purpose format defined by a standard exceeding the framework of a printer manufacturer, any printer, which is capable of printing an image of a general-purpose format, can print an image from RAW data while restricting the manufacturing and developing costs thereof.

(3) The printer may further comprises: a compressing unit that compresses the image for each block and storing the same into a storage medium; and an expanding unit that expands the image stored in the storage medium for each band to be printed, wherein the print unit generates print data from the expanded image for each band to be printed and, based on the print data, prints the image for each band to be printed.

Generally, since the print data have tone control values (including binary values) corresponding to the number of colors of ink and toner with respect to the number of pixels corresponding to the print resolution, the data size is considerably larger than the image. For this reason, by generating the print data for each band to be printed and executing a printing operation for each band to be printed, a storage resource such as a memory can be saved. However, to execute an image processing such as a rotation processing within the printer, the whole of the image must exist statically within a storage space. For example, a digital camera generally records an image in a format long in the horizontal direction, whereas most of printers print the image long the vertical direction in order to restrict the oblique movement of printing paper. Therefore, the printer's rotation processing is inevitably necessary. However, when, while the whole of an image is held in the internal memory of a printer, the print data are also held in the internal memory, there arises a problem that the necessary capacity of the internal memory is increased greatly. For this reason, the conventional printer executes a printing operation while reading discretely images stored in a removable memory for each band to be printed. However, when trying to print an image generated from RAW data, the whole of images generated must be held and thus, when the images are held in the internal memory of the printer, the manufacturing cost of the printer is inevitably increased to a great extent. This problem can be solved by compressing the images generated from the RAW data for each block and storing them in a storage medium, expanding the compressed images for each band to be printed, and generating print data from the expanded images for each band to be printed. The reason for this is that, by compressing the images for each band to be printed, the whole of the images can be held in a memory space and also, while data in an area not belonging to the band to be printed are held in the memory space in a compressed state, by expanding the images for each band to be printed, the print data can be generated.

(4) The expanding unit may set the band to be printed so that the image is divided in the horizontal direction.

When a horizontally long image (an image in which the number of horizontal direction pixels is larger than the number of vertical direction pixels) is printed in the horizontal direction (when pixels arranged in the horizontal direction are sequentially printed according to paper feed distances), or when a vertically long image is printed in the vertical direction, the expansion of the images and the generation of the print data must be carried out for each band to be printed in which the image is divided in the horizontal direction. To print a horizontally long image in the horizontal direction of the image corresponds to printing the image by rotating the same.

(5) The general-purpose format may be a JFIF format.

Since the JFIF format is the file format of a JPEG format image, it is highly versatile.

(6) The general-purpose format may be an Exif format.

Since the Exif format is practically a standard file format for a digital camera, it is highly versatile.

(7) The compressing unit may compress the image irreversibly with a quantizing step width corresponding to the free capacity of the storage medium.

Irreversible compression involved with quantization has an advantage that, as the quantizing step width increases, the data size of the image can be reduced accordingly, whereas it has a problem that, as the quantizing step width increases, the deterioration of the quality of the image becomes worse. In view of this, by giving priority to the image quality when the free capacity of the storage medium is sufficient, and by giving priority to the printing while the image quality is deteriorated when the empty capacity is insufficient, the handling facilitation of the printer can be enhanced.

(8) The printer may further comprises an user interface for previously informing an user of the degree of deterioration of the quality of the image caused by the compression and also for receiving a print cancel request from the user.

Provision of such user interface can prevent the image from being printed with disappointing image quality, thereby being able to enhance the handling facilitation of the printer further.

(9) The storage medium may be an external storage medium.

By storing images generated from the RAW data into an external storage medium such as a removable memory, a hard disk, and the internal memory of an external system, even when the free capacity of the internal memory is short, there can be enhanced a possibility that the images can be printed from the RAW data.

(10) The printer may further comprises storage unit that stores the image into an external storage medium, wherein the print unit prints the image stored in the external storage medium.

The addition of a function for generating an image from RAW data using a demosaicing processing to the printer makes it possible for the printer to print the image from the RAW data. However, generally, print data have tone control values (the tone control value includes a binary value) corresponding to the number of colors of ink or toner with respect to the number of pixels corresponding to the print resolution and, therefore, the data size is considerably large when compared with the image. In order to execute an image processing such as rotation within the printer, the whole of the image must be statically present within a storage space. For example, while a digital camera generally records an image in a format long in the horizontal direction, a printer often prints the image long in the vertical direction in order to prevent paper from moving obliquely. Therefore, in the case of a printer of a stand-alone type, a rotation processing by the printer is indispensable. However, when the whole of the image is held in an internal memory and at the same time the print data are also held in the internal memory, there arises a problem that the necessary capacity of the internal memory must be increase greatly. For this reason, in a conventional printer, while discretely reading images stored in a removable memory for every bands to be printed, a printing operation is executed. To print an image generated from RAW data, the whole of the image generated must be held and, when the image is held by the internal memory of the printer, the manufacturing cost of the printer is inevitably increased to a great extent. This problem can be solved by storing the image generated from the RAW data into an external storage medium such as a removable memory, a hard disk, and the internal memory of an external system. The reason for this is that, by storing the image generated from the RAW data into the external storage medium, there is eliminated the need to increase the capacity of the internal memory of the printer. Thanks to this, without increasing the manufacturing and developing cost of the printer, the image can be printed from the RAW data.

(11) the storage unit, when the printing of the image by the print unit may be completed, removes the image from the external storage medium.

Such removal of the image after printed can prevent the image generated regardless of the intention of a user from consuming uselessly the storage area of the external storage medium.

(12) The storage unit may check whether the external storage medium is in a writable state or not and, when the external storage medium is in an unwritable state, requests a user to replace the external storage medium.

When the user requested to replace the external storage medium replaces it with a writable external storage medium, the printer can keep on printing.

(13) The storage unit may check the external storage medium for the free capacity thereof and, when the external storage medium is short of the capacity for storing the image, displays a file removal menu for removing data stored in the external storage medium.

When the user removes a file according to the file removal menu displayed, the free capacity of the external storage medium is increased, so that the printer can keep on printing.

(14) The storage unit may check the external storage medium for the free capacity thereof and, when the external storage medium is short of the capacity for storing the image, requests a user to add another external storage medium.

When the user requested to add another external storage medium adds another external storage medium having sufficient capacity, the printer can keep on printing.

(15) The storage unit, when the external storage medium is composed of two or more external storage mediums, may check the external storage mediums for their respective free capacity and stores the image into the external storage medium having free capacity capable of storing the image therein.

By storing the image into an external storage medium having free capacity capable of storing the image therein, even if one of the external storage mediums is short of free capacity, when another external storage medium has sufficient free capacity, the printer can keep on printing without troubling the user.

(16) The storage unit may store the image into the external storage medium with the hidden attributes thereof set.

Since the image is stored into an external storage medium for the convenience of the printer which has generated the image regardless of the intention of a user, preferably, the hidden attributes of the image may be set.

(17) The storage unit irreversibly may compress the image with a quantizing step width corresponding to the free capacity of the external storage medium and stores the thus compressed image into the external storage medium.

The irreversible compression involved with quantization, on one hand, has an advantage that, as the quantizing step width increases, the data size of the image can be reduced accordingly; but, on the other hand, it raises a problem that, as the quantizing step width increases, the deterioration of the image quality becomes worse accordingly. In view of this, when the free capacity of the external storage medium is sufficient, priority is given to the image quality and, when it is insufficient, priority is given to the printing even if the image quality is deteriorated. This can facilitate the handling of the printer.

(18) According to the invention, there is also provided An image processing apparatus, comprising; an input unit that inputs RAW data and attribute information about the RAW data; a setting unit that sets a correction parameter based on the attribute information; an image generating unit that generates an image from the RAW data using a demosaicing processing; and an image correcting unit that corrects the image using the correction parameter.

Generally, in an image input apparatus such as a digital camera, to RAW data, there is added attribute information which is necessary to generate an image from the RAW data. The image generated based on such attribute information is, as it were, under the control of the image input apparatus or the user thereof. However, as described above, when a processing to be executed for generating an image under the control of the image input apparatus or the user thereof based on such attribute information and a processing for correcting the image under the control of the image input apparatus or the user thereof after generation of the image are similar to each other, by carrying out the former and latter processings collectively, the quality of the final image can be enhanced and the processing time necessary up to generation of the final image can be shortened. According to the present invention, since a correction parameter for correcting an image generated from RAW data is set based on attribute information about a final image, processings to be executed respectively for various purposes can unified into the correcting processing for correcting the image generated from the RAW data.

(19) The setting unit may generate a file of a general-purpose format with the image and the correction parameter stored therein, and the image correcting unit corrects the image using the correction parameter stored in the file of the general-purpose format.

Software resources and hardware resources, which are necessary for the image processing, can be saved by using them in common. That is, whether an image is an image generated from RAW data by the image processing apparatus itself or an image generated by an external apparatus, when the image processing apparatus is capable of processing the images using the same software resources and hardware resources, the manufacturing and developing cost of the image processing apparatus can be reduced as well as the developing time thereof can be shortened. Therefore, when the image generated from the RAW data by the image processing apparatus and the correction parameter set by the image processing apparatus based on the attribute information of the RAW data are stored into the file of the general-purpose format, the manufacturing and developing cost of the image processing apparatus can be reduced as well as the developing time thereof can be shortened.

(20) The image generating unit may not execute a sharpness correcting processing, and the image correcting unit may enforce a sharpness correcting processing on the image using the correction parameter.

(21) The image correcting unit may enforce a resolution conversion processing on the image and enforces the sharpness correcting processing on the image with the resolution conversion processing enforced thereon.

By unifying the sharpness correcting processing to be executed before execution of the resolution conversion and the sharpness correcting processing to be executed after execution of the resolution conversion into the sharpness correcting processing to be executed after execution of the resolution conversion, the quality of the image and the processing speed can be enhanced.

(22) The resolution conversion processing may be a resolution conversion processing to provide a print resolution.

The resolution conversion processing to provide a print resolution is a resolution conversion processing which is enforced last. Therefore, when the sharpness correcting processing is not executed before the resolution conversion processing to the print resolution but the sharpness correcting processings for two or more purposes are executed collectively after execution of the resolution conversion processing to the print resolution; the sharpness correcting processings can be optimized.

(23) The attribute information may include information about the model of an image input device having generated the RAW data, and the setting unit may set the correction parameter according to the model information.

If the model information can be specified, it is possible to set a control value for a sharpness correcting processing to be executed for recovering the lowered sharpness due to a low pass filter provided in an image input apparatus such as a digital camera. Thus, by setting a correction parameter for the sharpness correcting processing after generation of the image based on the model information of the image input apparatus, the quality of the image and the processing speed can be enhanced.

(24) The attribute information may include a fixed operation value for a sharpness correcting processing for recovering the lowered sharpness due to a low pass filter provided in an image input apparatus, and the setting unit may set the correction parameter according to the fixed operation value.

If a fixed operation value for a sharpness correcting processing for recovering the lowered sharpness due to a low pass filter provided in an image input apparatus exists as attribute information about the RAW data, by setting a correction parameter for the sharpness correcting processing after generation of the image based on the fixed operation value, the quality of the image and the processing speed can be enhanced. The operation value for a sharpness correcting processing for recovering the lowered sharpness due to a low pass filter provided in an image input apparatus can be decided in only one meaning. In view of this, the operation value for a sharpness correcting processing for recovering the lowered sharpness due to a low pass filter provided in an image input apparatus is herein referred to as a fixed operation value for a sharpness correcting processing for recovering the lowered sharpness due to a low pass filter provided in an image input apparatus.

(25) The attribute information may include a variable operation value for a sharpness correcting processing set according to the operation of the image input apparatus, and the setting unit may set the correction parameter according to the fixed operation value and the variable operation value.

If a variable operation value for a sharpness correcting processing set according to the operation of the image input apparatus exists as attribute information about the RAW data, by setting a correction parameter for the sharpness correcting processing after generation of the image based on the fixed operation value, the quality of the image and the processing speed can be enhanced. The operation value for a sharpness correcting processing set according to the operation of the image input apparatus varies according to the operation of the image input apparatus. In view of this, the operation value for a sharpness correcting processing set according to the operation of the image input apparatus is herein referred to as a variable operation value for a sharpness correcting processing set according to the operation of the image input apparatus. Referring to such variable operation value, for example, in a portrait photograph mode, there is set a variable operation value which lowers the sharpness of the image; and, in a landscape photograph mode, there is set a value which enhances the sharpness of the image.

(26) According to the invention, there is also provided a method for processing an image, comprising: inputting RAW data and information about the attribute of the RAW data; setting a correction parameter based on the attribute information; generating an image from the RAW data using a demosaicing processing; and correcting the image using the correction parameter.

By setting a correction parameter for correcting an image generated from RAW data based on the attribute information about the RAW data, processings to be executed for two or more purposes can be unified into a correction processing for correcting the image generated from the RAW data.

(27) According to the invention there is also provided an image processing program for operating a computer, comprising: an input unit that inputs RAW data and information about the attribute of the RAW data; a setting unit that inputs a correction parameter based on the attribute information; an image generating unit that generates an image from the RAW data using a demosaicing processing; and an image correcting unit that corrects the image using the correction parameter.

By setting a correction parameter for correcting an image generated from RAW data based on the attribute information about the RAW data, processings to be executed for two or more purposes can be unified into a correction processing for correcting the image generated from the RAW data.

(28) According to the invention there is also provided an image processing apparatus, comprising: an input unit that inputs RAW data and information about the attribute of the RAW data; a setting unit that sets a correction parameter based on the attribute information; an image generating unit generates an image from the RAW data using a demosaicing processing; and an output unit that outputs a file in which the correction parameter and the image are stored.

By setting a correction parameter for correcting an image generated from RAW data based on the attribute information about the RAW data, even when the image processing apparatus having generated the image from the RAW data itself does not correct the image, processings to be executed for two or more purposes can be unified into a correction processing for correcting the image generated from the RAW data.

(29) According to the invention, there is also provided a method for processing an image, comprising: inputting RAW data and information about the attribute of the RAW data; setting a correction parameter based on the attribute information; generating an image from the RAW data using a demosaicing processing; and outputting a file in which the correction parameter and the image are stored.

By setting a correction parameter for correcting an image generated from RAW data based on the attribute information about the RAW data, even when the image processing apparatus having generated the image from the RAW data itself does not correct the image, processings to be executed for two or more purposes can be unified into a correction processing for correcting the image generated from the RAW data.

(30) According to the invention, there is also provided an image processing program for operating a computer, comprising: an input unit that inputs RAW data and information about the attribute of the RAW data; a setting unit that sets a correction parameter based on the attribute information; an image generating unit that generates an image from the RAW data using a demosaicing processing; and an output unit that outputs a file in which the correction parameter and the image are stored.

By setting a correction parameter for correcting an image generated from RAW data based on the attribute information about the RAW data, even when the image processing apparatus having generated the image from the RAW data itself does not correct the image, processings to be executed for two or more purposes can be unified into a correction processing for correcting the image generated from the RAW data.

By the way, the respective functions of the two or more unit provided by the present invention can be realized by a hardware resource the function of which can be specified by its structure itself, a hardware resource the function of which can be specified by a program, or a combination of these hardware resources. Also, the respective functions of the two or more unit are not limited to those that can be realized by hardware resources which are physically independent of one another. Also, the present invention not only can be specified as an invention of an apparatus but also can be specified as an invention of a program, as an invention of a storage medium with the program recorded therein, and as an invention of a method.

BRIEF DESCRIPTION OF THE DRAWINGS

The above objects and advantages of the present invention will become more apparent by describing in detail preferred exemplary embodiments thereof with reference to the accompanying drawings, wherein:

FIG. 8 is a typical view of messages and menus according to an embodiment of the invention.

DETAILED DESCRIPTION OF THE EMBODIMENTS

Hereinafter, description will be given below in the following order of an embodiment in which the invention is applied to a printer of a stand-alone type with reference to the accompanying drawings.

1. Structure of Printer
2. Operation of Printer
2-1. RAW data print setting
   Free capacity securing processing
   Development correction set processing
2-2 RAW data processing
2-3 Image print processing
3. Other embodiments

1. Structure of Printer

Figure 2:
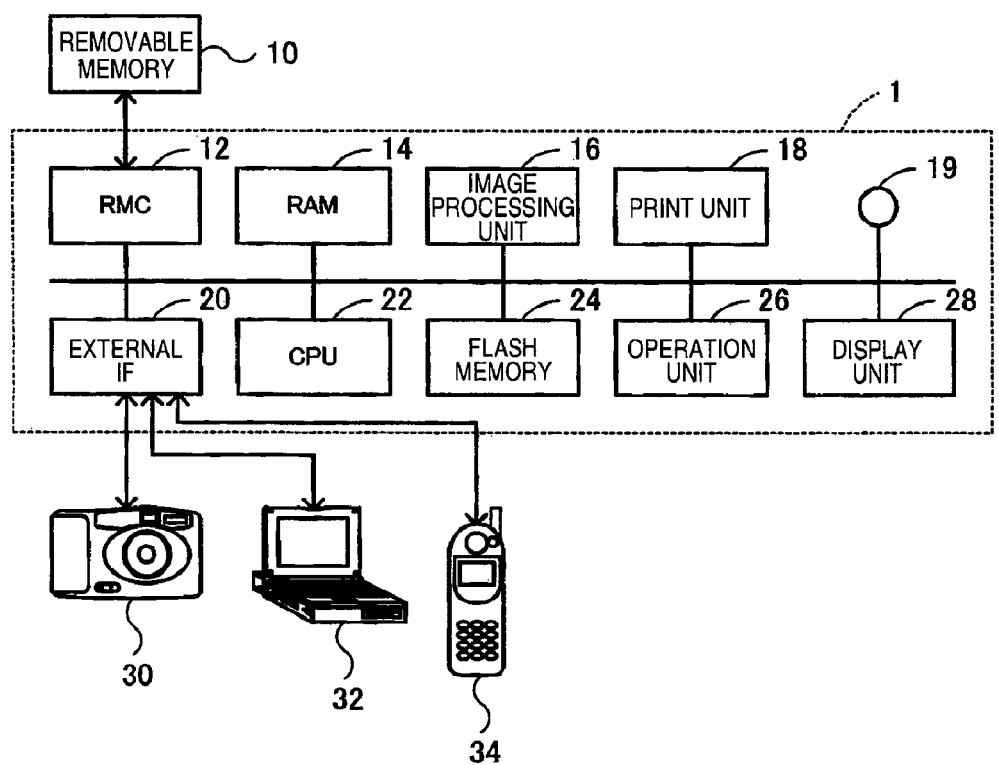
FIG. 2 is a block diagram of the schematic structure of a printer according to an embodiment of the invention.

FIG. 2 is a block diagram of the schematic structure of a printer 1 to which the invention is applied. The printer 1 is a printer of a so called stand-alone type which can read therein RAW data and images in a general-purpose format from a removable memory 10 and can execute a printing operation based on these data. Also, the printer 1 can directly input therein RAW data and images in a general-purpose format from an external system such as a digital camera 30, a PC (Personal Computer) 32 and a portable telephone terminal with a camera 34 and also can execute a printing operation based on these images.

An external IF (Inter Face) 20 serving as input unit and storing unit includes a USB controller, a USB connector and the like which are used to communicate with the external system such as the digital camera 30, PC (Personal Computer) 32 and portable telephone terminal with a camera 34. The communication standard is not limited to the USB but there can be used any other standard such as an IEEE 1394, an infrared ray, and Ethernet (registered trademark). Owing to provision of a USB host function in the external IF 20, when the external system corresponds to a USB mass storage standard, the printer 1 can gain access to a storage medium which belongs to the external system. Also, when a commonly used storage medium such as a hard disk is provided within a LAN to which the printer 1 is connected, the printer 1 can output data to a storage medium under the control of the external system. That is, even when a storage medium is under the control of the external system, the printer 1 not only can provisionally hold the images generated from the RAW data in the storage medium but also can read out the provisionally held images from the storage medium. Also, the printer 1 itself may have a hard disk device, which makes it possible to increase the storage capacity of the printer 1.

A removable memory controller (RMC) 12 serving as the input unit and the storing unit is connected through a connector (not shown) to the removable memory 10 serving as an external storage medium and controls data transfer between the removable memory 10 and RAM 14. The removable memory 10 may be a card-type flash memory (a so called memory card) or may be any other nonvolatile storage medium capable of repetitive writing.

An image processing unit 16 is composed of image processing LSIs and DSPs which cooperate together with a CPU 22 in executing an image correction processing such as a sharpness correction processing and a tone correction processing, a print division processing, a halftoning processing, an interlace processing, and other processings at a high speed. By the way, these processings may also be executed according to a program processing by the CPU 22. Also, a JPEG compression/expansion function may be added to the image processing unit 16, which makes it possible to speed up the JPEG compression/expansion processing.

A print unit 18 serving as printing unit and storing unit includes a recording head for forming an image on paper according to an ink jet method based on the print data, a mechanism for shuttling the recording head, a paper feed and discharge mechanism and the like. By the way, as the printing method, there can be employed any one of ink jet method, laser method, thermal method, dot impact method and the like.

The RAM 14 is a volatile memory in which a control program and data to be processed by the control program, for example, the RAW data, images and print data are provisionally stored.

The CPU 22, which serves as image generating unit, compressing unit, expanding unit, storing unit and printing unit, executes a control program stored in a flash memory 24, whereby the CPU 22 not only executes image processings such as a processing for generating images from the RAW data and a JPEG compression/expansion processing using a demosaicing processing but also controls the respective parts of the printer 1 to control the execution of a printing operation. The control program may be transferred from a computer readable storage medium to the flash memory 24 or may be transferred from a remote server through a network to the flash memory 24.

An operation unit 26 serving as user interface includes an operation button, a jog dial and other various buttons which are used to receive the menu operation and print request of the user. When a specific button is depressed in a specific mode, various requests corresponding to the mode are input to the printer 1.

Figure 7:
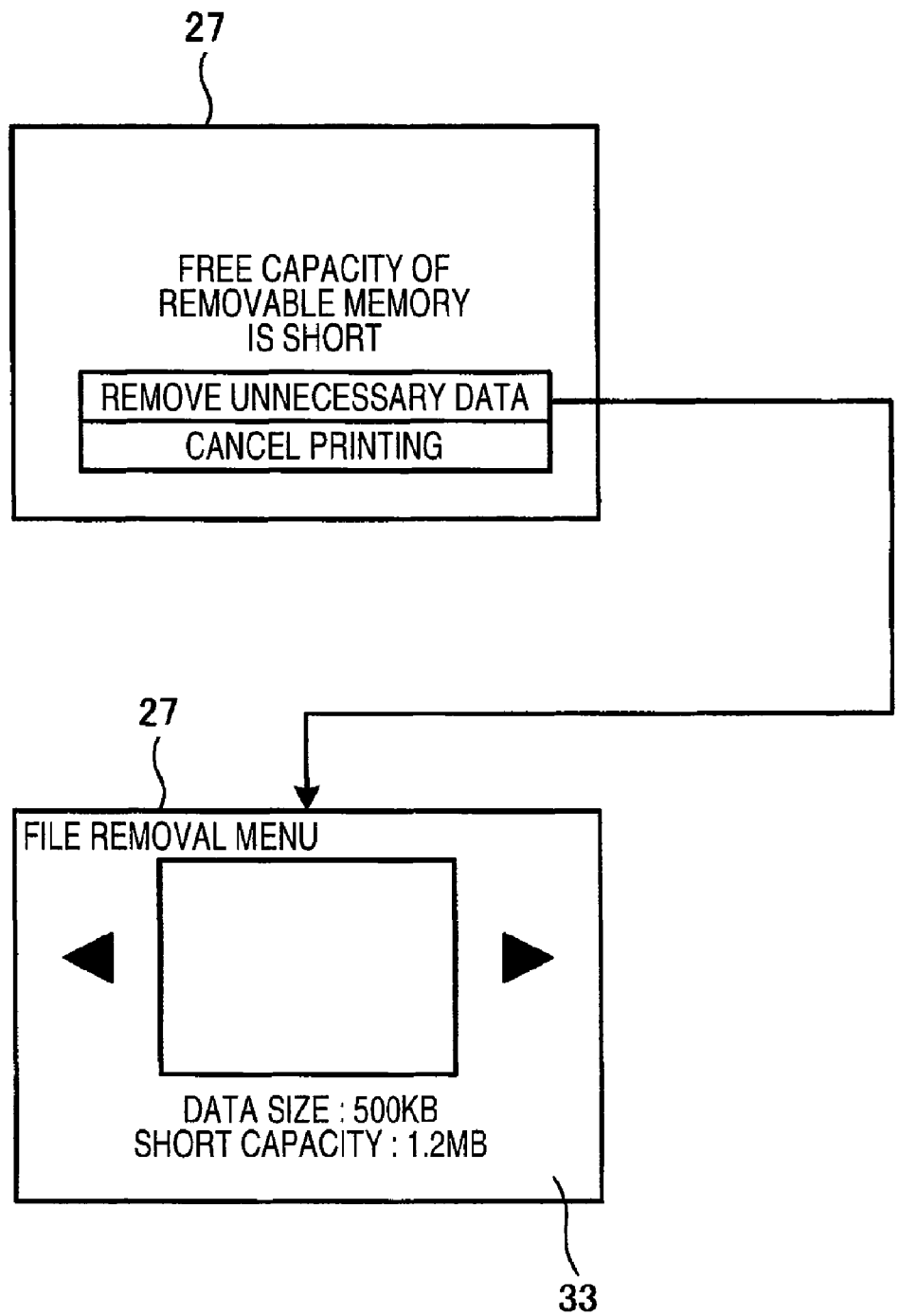
FIG. 7 is a view of screen transition according to an embodiment of the invention.

A display unit 28 serving as user interface includes a FPD (Flat Panel Display) 27 (see FIG. 7) such as an LCD, a graphic controller and the like. A frame memory area necessary for display of characters and images on the FPD 27 may be secured in an exclusive memory provided in the display unit 28, or may also be allocated to a partial area of the RAM 14. Data written into the frame memory area are read out periodically by the graphic controller, whereby the characters and images to be displayed on the FPD 27 can be updated.

An access indicator 19 includes a light such as an LED for informing a user of data transfer between the RMC 12 and RAM 14, and further includes a controller for the light.

2. Operation of Printer

Figure 3:
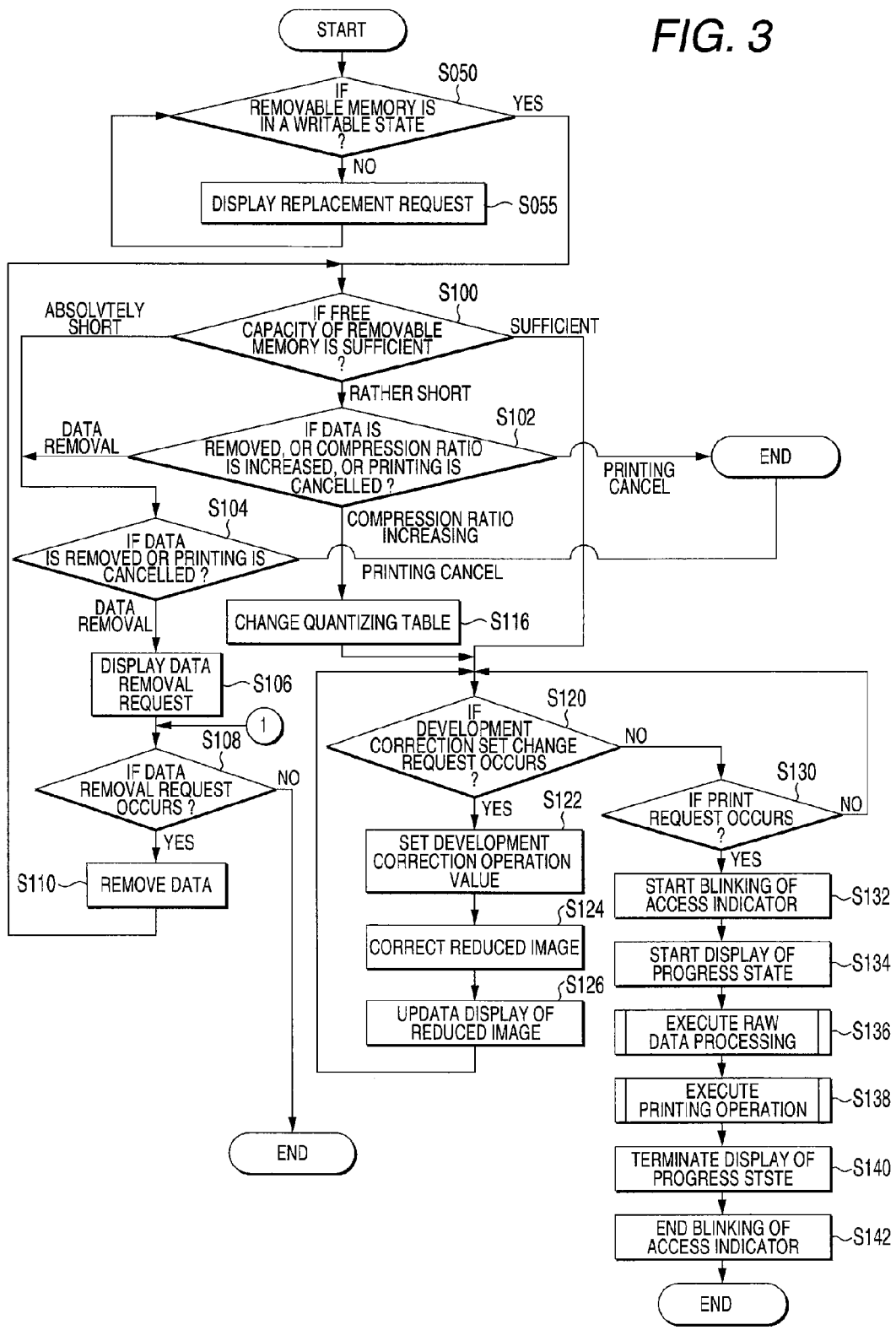
FIG. 3 is a flow chart of the operation of a printer according to an embodiment of the invention.

Now, FIG. 3 is a flow chart of the operation of the printer 1. The processing shown in FIG. 3 can be started when, in a file-to-be-printed select mode, a RAW data file is selected as an object to be printed by a user. In the file-to-be-printed select mode, thumbnail images stored in the RAW data file and reduced images of a VGA size for display are displayed on the FPD. The images to be displayed can be specified by the analysis of the file header. When the display image of a VGA size or the like larger than the thumbnail image having 160×120 pixels are displayed, the user is able to estimate the print results with more accuracy. Therefore, when it is found from the manufacturer and model of a digital camera stored in the file header that an image larger than the thumbnail image is stored in the RAW data file, the larger image is to be displayed. When no image is stored in the RAW data file (in the present specification, description is given assuming that the RAW data are not images), may also generate a reduced image of the order of a VGA size according to a simpler high speed algorithm. Specifically, for example, by generating an image having a resolution one half that of the RAW data in each of the vertical and horizontal directions, the demosaicing processing can be speeded up; and, by omitting a white balance correction processing, a luminance correction processing, a pseudo color restrict processing and the like, the generation of the reduced image can be speeded up.

When the RAW data file is selected as an object to be printed, the printer 1 executes two main processings. They are a RAW data print set processing and a RAW data print processing. In the RAW data print set processing, the printer 1 checks the removable memory 10 for the free capacity thereof and, when the free capacity is not sufficient, the printer 1 requests its proper measure from the user or receives an image development correction set change request from the user. In the print processing, the printer 1 reads therein the RAW data from the removable memory 10, generates an intermediate image of a general-purpose format from the RAW data, stores the generated intermediate image into the removable memory 10, and, while reading therein the intermediate image of a general-purpose format generated by itself from the removable memory 10, executes an operation to print the intermediate image.

By the way, with regard to the data format of the intermediate image to be handled in the process in which the printer 1 prints the image from the RAW data, in the present embodiment, description is given of a JPEG format as an example. However, the invention is not limited to this but there may also be employed other general-purpose formats such as a JPEG 2000 format, a BMP format and a TIFF format, or there may also be employed a data format which is optimized by sacrificing the general purpose function thereof. Also, as for a format for a file including other attribute information than the intermediate image, similarly, in the present embodiment, description is given of an Exif format as an example. However, there may also be used a file format which is a partially changed version of an Exif standard, or there may be used a JPEG file format of a JFIF type, or may be used a file format which is optimized by sacrificing the general purpose function thereof.

2-1. RAW Data Print Setting

In Step S050, the printer 1 checks whether the removable memory 10 is in a writable state or not. For example, it is checked whether a write inhibit check member is in a write inhibit position and the removable memory 10 is thereby inhibited from writing or not. By the way, when two or more removable memories 10 can be connected to the RMC 12 at the same time, if one or more removable memories 10 are in a writable state, the printer 1 may judge that the removable memory 10 is in a writable state. In this case, the writable removable memory 10 is set as an object into which the intermediate image is to be stored. Or, only when a removable memory exclusively used to store the intermediate image therein is connected to the RMC 12 separately from a user's removable memory 10 with the RAW data file stored therein, the printing operation based on the RAW data may be executed.

When the removable memory 10 is not in a writable state, the printer 1 displays on the FPD 27 a message which requests the replacement of the removable memory 10. For example, as shown in FIG. 8 (A), on the FPD 27, there is displayed a message to the effect that "Replace the removable memory with a writable removable memory". Or, on the FPD 27, there may also be displayed a message to urge the removal of the write inhibit state of the removal memory 10. For example, on the FPD 27, there may be displayed a message that "The memory card is set in a write inhibit state. Remove the write inhibit state of the memory card". By the way, the printer 1 may also request the replacement of the removable memory or may request the removal of the write inhibit state of the removable memory through sound. While a message is being displayed, when a previously determined operation button provided on the operation unit 26 is depressed, the printer 1 goes back to Step S050 and resumes the processing.

In Step S100, the CPU 12 checks the removable memory 10 for the free capacity thereof. Specifically, for example, the data size of the intermediate image is estimated for each compression quality from the number of pixels of the RAW data to be printed and the like and, when the free capacity is short even for the lowest quality, the free capacity is judged to be absolutely short. In this case, free capacity securing processings in Step S104 and in its following steps are executed. When the free capacity is sufficient even for the highest quality, the free capacity is judged to be sufficient. In this case, development correction setting processings in Step S120 and in its following steps or printing processings in Step S130 and in its following steps are executed. And, when the free capacity is insufficient for the highest quality but is sufficient for the lowest quality, the free capacity is judged to be somewhat short and thus a processing in Step S102, which will be discussed next, is executed.

In Step S102, there is informed a user to the effect that the free capacity of the removable 10 is not sufficient and thus the printing is made possible by lowering the compression quality or by removing unnecessary data. The printer 1, specifically, displays such a message as shown in FIG. 8 (B) on the FPD 27 to thereby request the choice of one of print cancellation, data removal and compression ratio increase. When the print cancellation is chosen, the processing on the RAW data to be printed is terminated. When canceling the printing, the printer 1 displays on the FPD 27 a message to the effect that "Execution of printing is impossible and the printing is cancelled", and then the printer 1 cancels the print processing. For the choice of the data removal, free capacity securing processings in Step S106 and in its following steps are executed. For the selection of the compression ratio increase, the free capacity of the removable memory 10 and the highest quality within the restriction of the number of pixels of the RAW data are displayed on the FPD 27 by words such as "high", "medium" and "low"; and, when the compression quality is approved, a quantizing table change processing in Step S116 is executed. Approval or rejection of the compression quality can be input, for example, when a previously determined button provided on the operation unit 26 is pressed down in a state where a message shown in FIG. 8 (C) is being displayed. When rejection of the compression quality is chosen, the message moves to the screen shown in FIG. 8 (B). In order to check the free capacity of the removable memory 10 and the highest compression quality within the restriction of the pixel number of the RAW data, the CPU 12, for example, refers to a table which shows correspondence between the free capacity, the number of pixels and the compression quality and executes a previously decided operation with these elements as variables.

In Step S116, there is set a quantizing table which corresponds to the compression quality approved by the user. The quantizing table is a table which prescribes quantizing step widths stage by stage according to DCT coefficients. As the quantizing step width broadens, the lowering of the image quality after expansion becomes worse; and, as the quantizing step width narrows, the lowering of the image quality after expansion is restricted accordingly. By the way, in Step S100, when the free capacity is judged to be sufficient, there is used a quantizing table of the highest quality which is a default setting.

Free Space Securing Processing

In Step S104, the printer 1 requests the user to select data removal for the purpose of increasing the free capacity of the removal memory 10, or print cancellation. Specifically, for example, the printer 1 displays a menu shown in FIG. 7 on the FPD 27 and receives the selection of the data removal or print cancellation. When a predetermined button of the operation unit 26 is depressed, the data removal or print cancellation is selected. When the print cancellation is chosen, the processing on the RAW data to be printed is terminated.

When the data removal is chosen, the printer 1 displays a file removal menu 33 on the FPD 27 (Step S106). On the file removal menu 33, for example, according to the operation of the button or the rotation of the jog dial, there are displayed sequentially images to be removed one by one. Also, on the file removal menu 33, there are also displayed the necessary free capacity and the data size of the images being displayed together with the images to be removed. The user can select a file to be removed by operating the button or jog dial to display the images to be removed.

When a removal request occurs (Step S108), the CPU 22 allows the RMC 12 to remove the file to be removed from the removable memory 10 (Step S110). Referring specifically to the occurrence of the removal request, for example, when the user presses down a given button on the file removal menu 33, the removal request occurs while a file being selected at the then time is as a target to be removed. When the file is removed from the removable memory 10, the processings in Step S100 and in its following steps are repeated.

When the removal rejection occurs (Step S112), the CPU 22 terminates the printing processing. Specifically, the removal rejection occurs, for example, when the user depresses a given button in a state where the above-mentioned message is being displayed.

Development Correction Set Processing

In Step S120, when a development correction set change request occurs, there are executed the following development time correction set processings. The development correction set change request occurs when a previously determined given button is depressed.

In Step S122, the printer 1 sets a develop correction operation value according to the operation of the user. Specifically, for example, when a dialog screen shown in FIG. 8 (D) is displayed on the FPD 27 and an EV operation (development correction operation value), for example, "+1" is selected, the operation value, "+1", is set and, at the same time, there is set a control value which raises the luminance of the image by 1 in the EV (Exposure Value) conversion, that is, a luminance control value which allows the lightness of the image to be double in the luminance conversion. By the way, there may also be set other control value than the control value for the luminance correction processing, for example, an operation value for the sharpness correction processing or white balance correction processing. Here, the sharpness operation value that can be set in this manner is corrected in the below-mentioned manner and is then added to an intermediate image as "image correction control information for the purpose of obtaining a desired print result".

In Step S124, the CPU 22 executes an image processing corresponding to the develop correction operation value on a reduced image displayed on the FPD 27 in the mode of selection of the file to be printed. Specifically, on the reduced image of a VGA size stored in the file to be printed, there are executed correction processings (such as a luminance correction processing, a sharpness correction processing, and a white balance correction processing) to which there is applied a control value set in Step S122.

In Step S126, the printer 1 updates the reduced image displayed on the FPD 27 in the file to be printed selection mode into a reduced image after retouched. Specifically, the reduced image in a frame memory area is changed and written into the reduced image after retouched, and the display on the FPD 27 is updated. Since the reduced image after retouched is displayed on the FPD 27, the user, while confirming the retouched results on the screen, can set the development correction operation values repetitively until a satisfactory result can be obtained. By the way, as described above, the printer 1 may also execute such a display updating operation as reflects the operation value for the sharpness correction processing or white balance correction processing.

2-2. Printing Processing

When a print request occurs in Step S130, there are executed the following printing processings. The print request occurs when a predetermined given button is depressed.

In Step S132, the CPU 22 allows the access indicator 19 to start blinking. The blinking of the access indicator 19 continues until the printing operation is terminated. The printer 1, during execution of the printing operation, reads therein the RAW data and intermediate images from the removal memory 10 and writes the intermediate images into the removal memory 10. Accordingly, when the removal memory 10 is removed from the RMC 12 during execution of the printing operation, there is a possibility that unremovable intermediate images can be left in the removable memory 10 and the FAT of the removable memory can be destroyed to thereby disable the printer 1 from reading the data properly. The blinking operation of the access indicator 19 during execution of the printing operation can prevent the occurrence of the above problem caused by the user's careless removal of the removal memory 10.

In Step S134, the printer 1 displays a progress bar on the FPD 27 to thereby start a processing for guiding the printing progress state to the user. The display of the printing progress state continues until the printing operation is ended. Specifically, the progress bar notifies the user in real time what percentage the RAW development processing has progressed. For example, when the processing has finished about 20%, there is displayed a progress bar which shows the progress corresponding to 20% with respect to a scale of 100%. Normally, in a printer, since the processing speed of the CPU is slow due to the restriction of the manufacturing cost thereof, it takes several minutes to generate an image from the RAW data. The display of the progress bar is very effective, because it can eliminate the irritated feeling of the user and the user can know by it that the processing has been progressing positively.

In Step S136, an intermediate image is generated from the RAW data and the intermediate image is stored into the removable memory 10.

In Step S138, the intermediate image is read from the removable memory 10, print data are generated from the intermediate image, and a printing operation based on the print data is executed.

In Step S140, the progress bar provides a 100% display and the display of the printing progress state is ended.

In Step S142, the CPU 22 terminates the blinking of the access indicator 19.

RAW Data Processing

Figure 4:
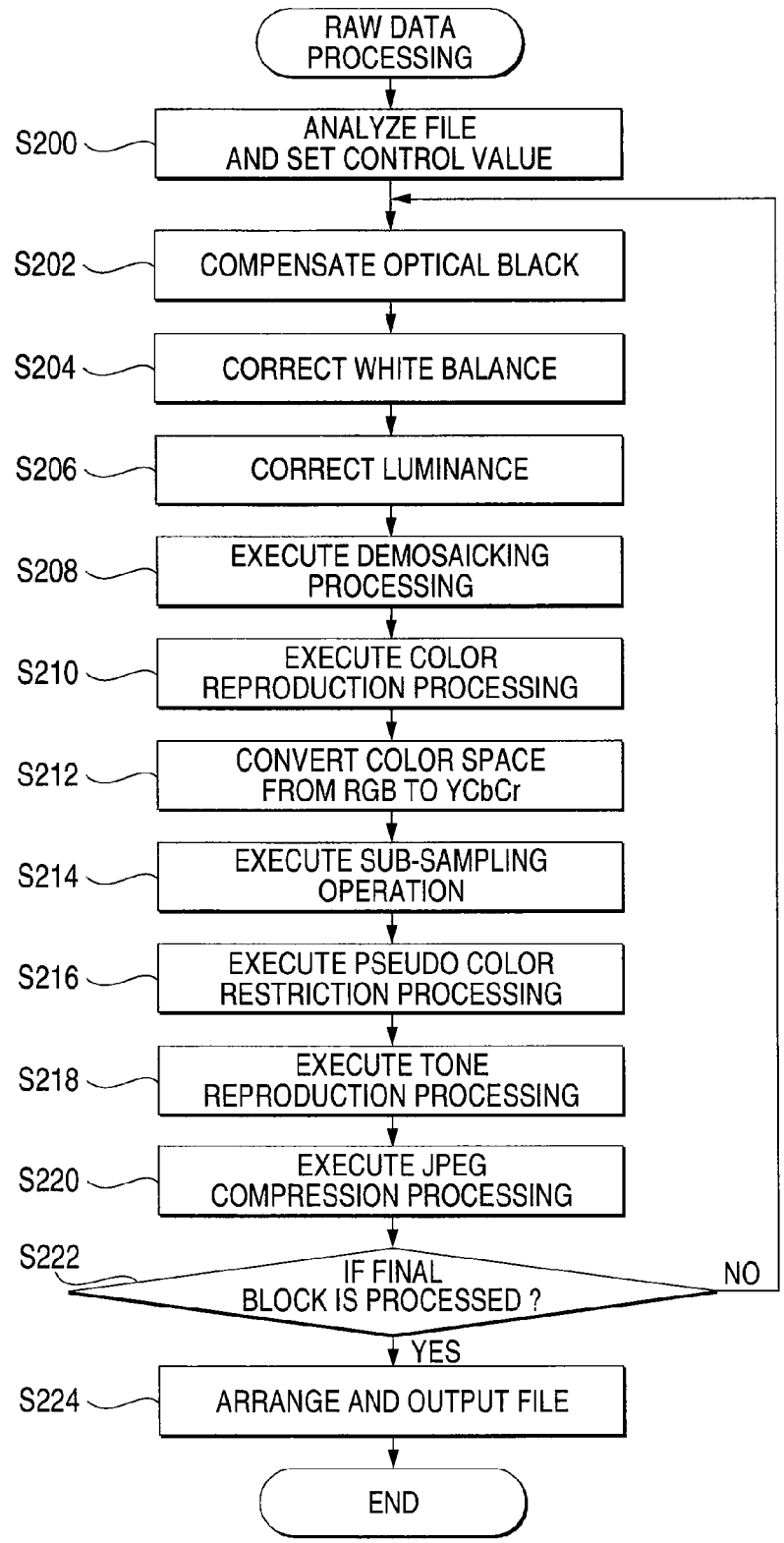
FIG. 4 is a flow chart of the flow of a processing to be executed in Step S136 in FIG. 3.

FIG. 4 is a flow chart of the details of the flow of the RAW data processing in the above-mentioned step S136.

In Step S200, the CPU 22 analyzes attribute information about the file to be printed to specify the manufacturer of a digital camera, the model of the digital camera, photograph information (date of photograph, stop, shutter speed and the like), print control information, development control information and the like. The print control information includes the specification of a print size, the specification of the number of paper to be printed, image correction control information for obtaining a desired print result, and the like. As a standard for transmission of the print size specification and print paper number specification from the digital camera to the printer, there is well known a DPOF (Digital Print Order Format). As a standard for transmission of the image correction control information for obtaining a desired print result from the digital camera to the printer, there are well known a PIM (Print Image Matching) standard and an Exif Ver 2.2 standard. The development control information includes a sharpness operation value for recovering the lowered sharpness caused by a low pass filter, an optical black value, gain information about each chromatic color component, luminance correction information, information about the arrangement of the color filter of an area image sensor, information for color space conversion from a device space color to sRGB color space or the like, gamma correction information, and other information. Since the development control information is peculiar to each digital camera, information about a file header is analyzed in every cameras and the analyzed result thereof is applied to a processing to be executed in the following step. As a general-purpose standard for the development control information, there is proposed a DNG standard. Referring to an essential difference between the image correction control information for obtaining a desired print result and the development control information, the former is defined as information which can be applied only to images, whereas the latter is defined as information which can be basically applied to a processing for generating images from the RAW data.

Processings in Steps S202 to S220, which will be discussed below in detail, are executed in a block unit. That is, in the first step S202, the RAW data of a block to be printed are read from the removable memory 10 into the CPU 22 and the processed results thereof are stored into the RAM 14. In the following steps, the data of a block to be processed are read into the CPU 22 and the processed results thereof are stored into the RAM 14. According to the 422 system of the JPEG standard, Cb and Cr components are sampled in the horizontal direction and; for every Y, Cb and Cr components, DCT operation processings are enforced on every block having vertical direction 8 pixels×horizontal direction 16 pixels, with the result that an image is encoded in every block having vertical direction 8 pixels×horizontal direction 16 pixels. Therefore, the vertical direction width of the block is set for 8 pixels or integer multiples of 8 pixels, while the horizontal direction width of the block is set for 16 pixels or integer multiples of 16 pixels. To execute a processing with the vertical direction width set for 8 pixels is efficient and the efficiency of use of a memory is also high.

Figure 1:
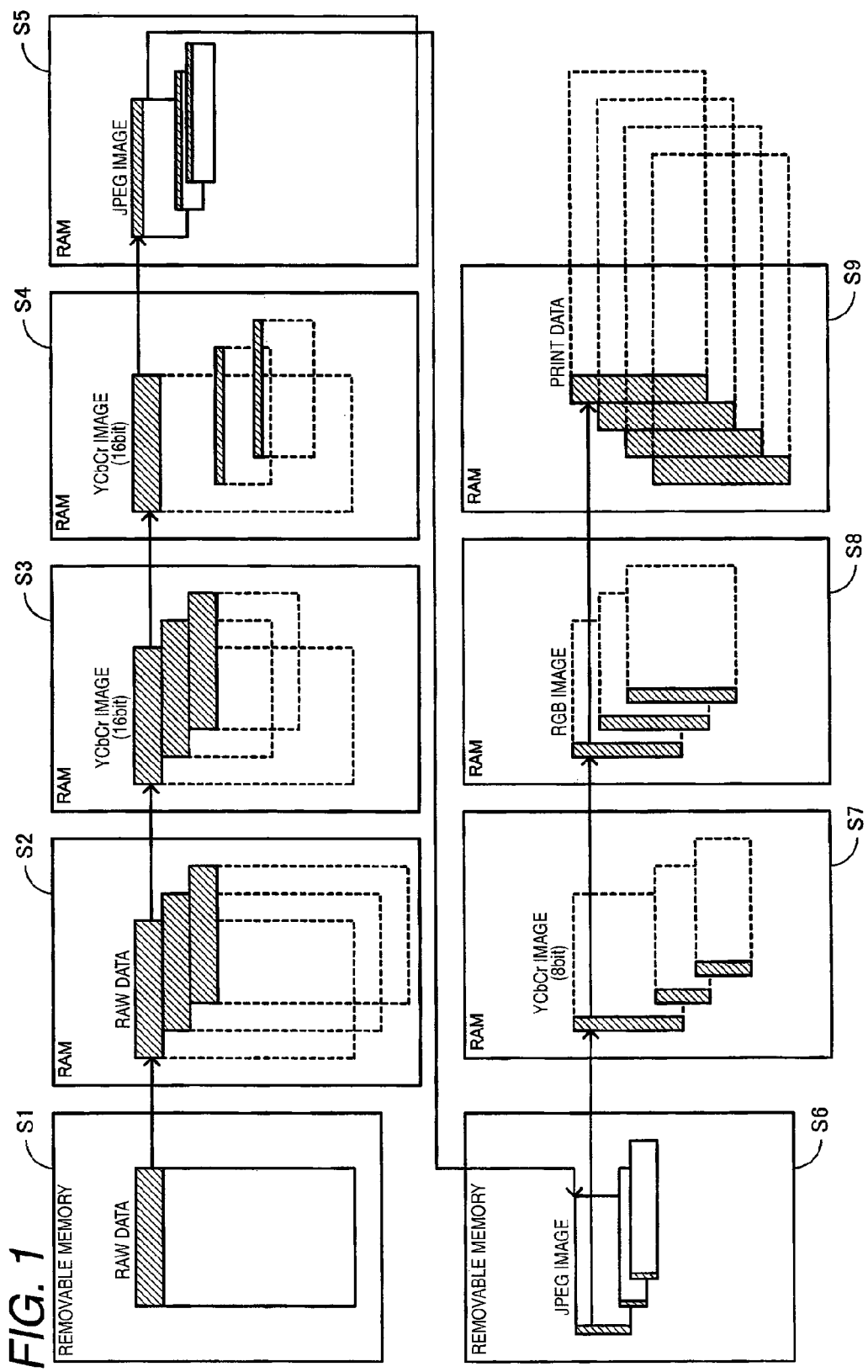
FIG. 1 is a typical view of an embodiment according to the invention.

Now, FIG. 1 is a typical view to show how to hold the data of a block to be processed until the print data are generated from the RAW data. A solid line expresses data size which occupies a memory space statically, while a hatching expresses the size of the data of the block to be processed. A broken line expresses the size of a memory space accumulatively necessary for processing of the whole of the RAW data.

By the way, while general RAW data are recorded in the tone of 12 bits per pixel, in the processing step, in order to enhance the access efficiency for every pixel, it is reasonable to handle a word (16 bits) per pixel. In the present embodiment, description is given assuming that the RAW data are an expression for 16 bits.

In Step S202, the CPU 22 carries out an optical black compensation processing based on an optical black value. The optical black value expresses a value obtained when the quantity of charges accumulated in a light receiving element, which is disposed in the image sensor of an image input device and is prevented against entry of light, is A/D converted. That is, the optical black value shows the zero level of the luminance of the pixel. When there exists an optical black area within the RAW data, the mean value of the optical black area is used as an optical black value. When an optical black value is previously calculated by the image input device and is stored in the file header, this value is used. The optical black compensation processing is a processing which is important to establish the linearity of processings to be executed in the following steps thereof. In an optical black compensation processing, a value, which is expressed by an optical black value obtained from the file header, is regarded as black, and a value expressed by the optical black value is subtracted from the whole pixel value of the RAW data. Generally, for the RAW data of 12 bits, the optical black value is about 32/4095-64/4095 and thus the number of bits are not varied by the optical black compensation processing. Data to be processed in Step S202, as shown in S1 in FIG. 1, are stored in the removable memory 10, and the processed results in Step S202 are stored in the RAM 14 in the same data size as the size before they are processed.

In Step S204, the CPU 22 executes a white balance correction processing based on gain information about every chromatic color components. The spectral radiation energy distribution of an object varies naturally when illumination environments differ, whereas human beings perceives the color of the same object as the same color even when the illumination environments differ. This tendency is referred to as the constant property of a color (color constancy). On the other hand, the image sensor accumulates the electric charges corresponding to the respective chromatic color components (in the present embodiment, they are described as RGB) in a balance corresponding to the spectral radiation energy distribution of an object. For this reason, for example, in order that an object to be perceived as a achromatic color (for example, white) in the daytime outside in a fine weather can be expressed by achromatic pixels (pixels having the same RGB value), there is necessary a color balance correction processing which corrects the color balance of the respective RGB components. In the color balance correction processing, using gain information specified on every RGB components, the respective RGB components are basically multiplied by a constant. As a result of this, although the number of bits representing the pixel value increases or decreases, because the original RAW data having 12 bits per pixel are processed with 16 bits per pixel, the size of the block data to be provisionally held by the RAM 14 does not vary before and after the execution of the processing in Step S204. By the way, with regard to the constant (normally, about 0.5-4) which is multiplied on the respective RGB components, a value as the gain information calculated as the optimum coefficient by the digital camera may be used as it is, or a value calculated from the RAW data according to a previously determined algorithm by the CPU 22 may be used.

In Step S206, the CPU 22 enforces a luminance correction processing based on the luminance correction information. With regard to this luminance correction processing, for example, when the physical exposure of the digital camera is inappropriate, to recover such inappropriate exposure, there is executed an exposure correction operation after an object is photographed by the digital camera; and, when luminance correction information corresponding to the exposure correction operation is stored in the file header, the present luminance correction processing is enforced. By the way, the luminance component may be multiplied by a constant to thereby correct the luminance, or the respective chromatic components may be multiplied by a constant to thereby correct the luminance. Specifically, when a +1 EV exposure correction is executed on the RAW data, a processing for multiplying the luminance components by a double coefficient is executed. When a −1 EV exposure correction is executed on the RAW data, a processing for multiplying the luminance components by a half coefficient is executed. As a result of this, although the number of bits representing the pixel value increases or decreases, because the original RAW data having 12 bits per pixel are processed with 16 bits per pixel, the size of the block data to be provisionally held by the RAM 14 does not vary before and after the execution of the processing in Step S206.

In Step S208, the CPU 22 executes a demosaicing processing corresponding to the arrangement of the color filter of an area image sensor. The demosaicing processing is a processing in which, basically, mutually adjoining pixels each having a chromatic color component (for example, one of R, G and B components) per pixel compensate their lacking chromatic color components with each other. As a result of this, the respective pixels, each of which had only one of R, G and B components, can have three (R, G and B) components and, therefore, the size of the block data to be held provisionally by the RAM 14, as shown in S2 in FIG. 1, becomes three times when compared with the site before the processing.

In Step S210, the CPU 22 executes a color reproduction processing. Since the values of the respective color components of the RAW data depend on the spectral sensitivity of the image sensor of the image input apparatus, they do not correspond to tristimulus values prescribed by a general-purpose standard such as an sRGB or the like. The color reproduction processing is a processing in which color lights expressed by the RAW data used as input values are expressed by stimulus values prescribed by a general-purpose standard such as an sRGB or the like. In other words, in the color reproduction processing, there are generated stimulus values expressing proper colors according to the general-purpose standard (the values of colors measured by a colorimeter as the same colors as the colors of a photographed target object) using a linear map or a nonlinear map for every three chromatic color components. Specifically, the stimulus values of the respective pixels are converted using a matrix operation of 3×3 or a three-dimensional LUT (Look Up Table) on the three (R, G and B) components. The matrix and three-dimensional LUT used in this conversion can be obtained as development control information from the file header, or a matrix or a three-dimensional LUT previously defined by a printer vendor according to the models can be set according to model information obtained from the file header. The size of the block data to be held by the RAM 14 does not vary before and after the processing in Step S210.

In Step S212, the CPU 22 enforces a color space conversion processing for converting the color space from the RGB color space to the YCbCr color space. This is a simple color space linear conversion processing for adapting the intermediate image to the JPEG format. As a result of this, the block data to be held by the RAM 14 provide such a state as shown in S3 in FIG. 1. The size of the block data to be provisionally held by the RAM 14 does not vary before and after the processing in Step S212.

In Step S214, the CPU 22 enforces a sub sampling processing according to the 422 method. As a result of this, only the Cb and Cr color difference components are reduced in space in the horizontal direction. That is, the Y component is not processed but the Cb and Cr components are sampled in space by a mean value in every two adjoining pixels. As a result of this, the size of the block data to be dynamically held by the RAM 14, as shown in S4 in FIG. 1, is $2/3$ $(=1/3+(1/3)\times(1/2)+(1/3)\times(1/2))$ when compared with the size before the processing.

In Step S216, the CPU 22 executes a pseudo color restrict processing. In an image sensor including a color filter having a Bayer arrangement, the number of light receiving elements in R and B is one half the number of light receiving elements in G, owing to the demosaicing processing, aliasing is easy to appear in the R and B components. A pseudo color generated due to this can be restricted by a flattening processing using a median filter or the like.

In Step S218, the CPU 22 executes a tone reproduction processing. The lightness perceived by human being does not correspond to the luminance that is the photometric quantity of the image sensor. Generally, the luminance is converted by a logarithmic function (for example, y=x (1/2.2) according to a Weber/Fechner hypothesis insisting that the quantity of perception is proportional to the logarithm of the stimulus quantity. By the way, in order to avoid a tone loss due to saturation, it is possible to execute transformation in which the tone is gradually restricted in the highlight area. The transformation is executed using, for example, a LUT which is defined optimally for every models of digital cameras.

In Step S220, the CPU 22 carries out a JPEG compression processing. The JPEG compression processing is an encoding processing composed of a combination of quantization and Huffman encoding, in which a processing is enforced on every blocks each having horizontal direction 8 pixels×vertical direction 8 pixels. For the quantization, there is applied a given quantizing table which has been previously determined or a quantizing table set in the above-mentioned step S116. A quantizing step width is set in such a manner that, in a block unit, the size of the data to be stored into the removable memory 10 can be, for example, about $1/6$-$1/4$ the size thereof before execution of the processing. By the way, as described above, the algorithm is not limited to the JPEG but any one of other algorithms may be used, provided that it encodes the data for every blocks.

By repetitively enforcing processings in Steps S202 to S220 on the block data that have been JPEG compression processed, the block data are accumulatively stored into the other area of the RAM 14 (that is, the other area than the area of the RAM 14 into which the block data prior to execution of the JPEG compression are stored). In a state where the processings in Steps S202 to S220 have been carried out repetitively up to the final block (in a state that is judged "yes" in Step S222), in the other area of the RAM 14, as shown in S5 in FIG. 1, there are held the whole of intermediate images of a JPEG format generated from the RAW data.

In Step S224, the CPU 22 arranges the file format of the intermediate images into the Exif format, carries out an output processing to the removable memory 10, and removes the intermediate image file of the Exif format provisionally held by the RAM 14 at the time when the output processing to the removable memory 10 is terminated. As a result of this, as shown in S6 in FIG. 1, the whole of the intermediate image file of the Exif format is held by the removable memory 10, while the data to be print processed that are held by the RAM 14 are entirely eliminated provisionally. Specifically, like a quantizing table, information necessary for expansion of the intermediate images, photograph information (date of photograph, stop, shutter speed and the like), print control information, image correction control information for obtaining a desired print result, and other similar information are added as file header information to thereby generate the intermediate images of the Exif format, the intermediate image file is stored into the removable memory 10, and the file size as well as the table and hidden attributes and the like of the file are stored into the FAT of the removable memory 10. The intermediate image file generated as a result of the development processing is stored into the removable memory 10 according to the convenience of the printer 1, which has generated the file, regardless of the intention of the user and, therefore, preferably, the table and hidden attributes of the file may be set as a "hidden file".

By the way, when the RAM 14 has such a sufficient capacity as to be able to eliminate the need for execution of the output processing to the removable memory 10, there is no need to remove the intermediate image file of the Exif format from the RAM 14. Of course, in that case, the output processing for outputting the intermediate image file to the removable memory 10 is not necessary, either. Also, there is also possible a processing which does not hold the whole of the intermediate image file of the Exif format in the RAM 14. For example, after, when enforcing the processing in the above-mentioned step S220, the output processings to the removable memory 10 are carried out for every blocks and the output processings to the removal memory 10 for all blocks are completed, information necessary as the Exif file may be stored into the removable memory 10.

By the way, in the present embodiment, a sharpness correction processing is not enforced on the intermediate images which are stored into the removable memory 10. Since an image input apparatus such a digital camera includes a low pass filter for prevention of aliasing, it is necessary to enforce a sharpness correction processing for recovering the lowered sharpness of the images caused by the low pass filter of the image input apparatus. Therefore, in the conventional system which generates images from the RAW data, such sharpness processing has been enforced before the images are output. However, when a resolution conversion processing is enforced on the images on which a sharpness correction processing has been enforced, there is a tendency that the quality of the images can be deteriorated. On the other hand, in the process for printing the images, a resolution conversion processing and a sharpness correction processing to the print resolution are always executed. This is because, as the print size increases, the image is more out of focus and, as the print size decreases, the image is sharper.

In view of this, in the present embodiment, in order that the sharpness correction processings can be executed at a time when the resolution is converted so as to match the print resolution or after the resolution is converted so as to match the print resolution, the information for the printer 1 to be able to apply a control value for the sharpness correction processings to the images is transmitted to the processings to be executed thereafter as image correction information for obtaining a desired print result; and, the above-mentioned sharpness correction processings include a sharpness processing for recovering the lowered sharpness due to the low pass filter of the image input apparatus and sharpness correction processings to be executed for attaining their respective purposes (for example, a purpose of optimizing the appearance of a picture by lowering the sharpness of a portrait image and by raising the sharpness of a landscape image, and a purpose of optimizing the sharpness of a picture according to the print sizes). The thus transmitted image correction control information corresponds to a correction parameter.

Specifically, for example, it is assumed that, in the RAW data file, a sharpness operation value is set for "+1" as the image correction control information for obtaining a desired print result. In the case of a conventional printer (for example, a printer adapted to PIM), when the sharpness operation value of an image to be processed is set for "+1", a uniform control value corresponding to a sharpness operation value "+1" is applied to the images, which are generated by any model of digital camera, in a sharpness correction processing. On the other hand, in the printer 1 according to the present embodiment, for example, even when a sharpness operation value is set for "+1" in the RAW data file to be processed as the image correction control information for obtaining a desired print result (by the way, conventionally, there has not been known a digital camera in which the image correction control information for obtaining a desired print result is added to the RAW data file), since a sharpness operation value (for example, "+1" or "+2" to "0", "+2" or "+3" to "+1") with the property of a low pass filter for each digital camera taken into account is transmitted as the sharpness operation value of the intermediate image, control values differing in every digital cameras are applied in the sharpness correction processing that will be discussed later. Also, this applies similarly to the development correction operation values which are set in Step S122. Even when a sharpness operation value "+1" is set as the development correction operation value, a sharpness operation value (for example, "+1" or "+2" to "0", "+2" or "+3" to "+1") with the property of a low pass filter for each digital camera taken into account is transmitted as the sharpness operation value of the intermediate image. The property of a low pass filter in each digital camera can be specified by attribute information such as development control information and mode information stored in the RAW data file. Therefore, the CPU 22 sets the image correction control information for obtaining a desired print result based on the attribute information such as the development control information and mode information attached to the RAW data.

By the way, a method for transmitting the control information with the device property of the image input apparatus such as a digital camera taken into account is not limited to a method for recording the control information in the file header of the intermediate image but the control information may also be transmitted through a closed API within the printer 1.

Image Print Processing

Figure 5:
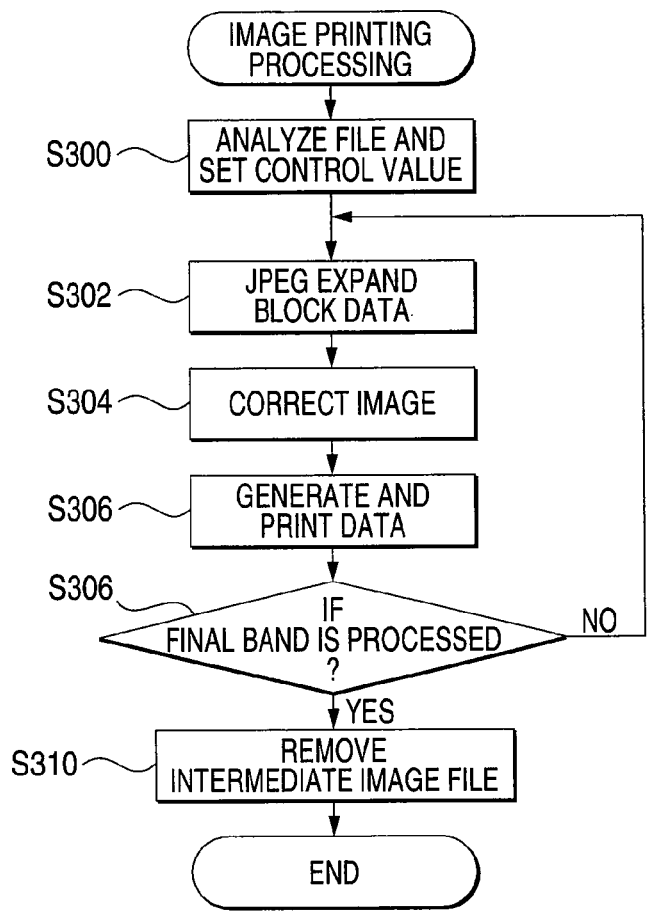
FIG. 5 is a flow chart of the flow of a processing to be executed in Step S138 in FIG. 3.

Now, FIG. 5 is a flow chart of the details of the flow of the image print processing in the above-mentioned step S138.

The processing shown in FIG. 5 is substantially the same as a processing which is carried out when an image of the JPEG format or the like is selected as an object to be printed. That is, the printer 1 according to the present embodiment executes an image print processing using entirely the same software resource and hardware resource whether an object to be printed is the RAW data or the image. As a result of this, the time necessary for development of the printer 1 can be shortened as well as the manufacturing and developing costs of the printer 1 can be reduced.

In Step S300, the CPU 22 analyzes the header of an intermediate image file which is a file to be printed to thereby specify information necessary for expansion of the intermediate image, photograph information, print control information, image correction control information for obtaining a desired print result, a file size and the like, and sets a control value necessary for printing of the intermediate image based on these pieces of information. Specifically, for example, the CPU 22 sets a quantizing table, a control value for a sharpness correction processing, a control value for a color balance correction processing, a control value for a tone correction processing, a control value for a memory color correction processing, the number of paper to be printed, the size of printing paper, a printing resolution and the like. By the way, as the print control information, there may be used the DPO data or the like attached to the image to be printed or, of course, the user may set control values for the print size, print resolution and the like through the operation unit 26.

Processings in steps from S302 to S306, which will be described below in detail, are executed in the unit of a band to be printed. Normal printing is sequentially executed starting from one side of the image toward the opposing side thereof. Therefore, the processings advance sequentially in a band unit along the printing direction. That is, in the first step S302, compressed data in a band to be printed are read out from the removable memory 10 into the CPU 22 and the processed result thereof is stored into the RAM 14; and, in the following steps, the data of the band to be printed are read from the RAM 14 into the CPU 22 and the processed result thereof is stored into the RAM 14. The bands to be printed are set along the printing direction. The image of a digital camera is normally an image which is longer in the horizontal direction at a ratio of 3 to 2 and, in order that a printer having a narrow width can print an image having a large area, it is reasonable to print the image sequentially in the long side direction thereof. Therefore, generally, firstly, an image long in the horizontal direction is turned 90 degrees to convert it to an image which is long in the vertical direction, and the vertically long image is printed in the long side direction from one of the short sides thereof toward the other.

Figure 6:
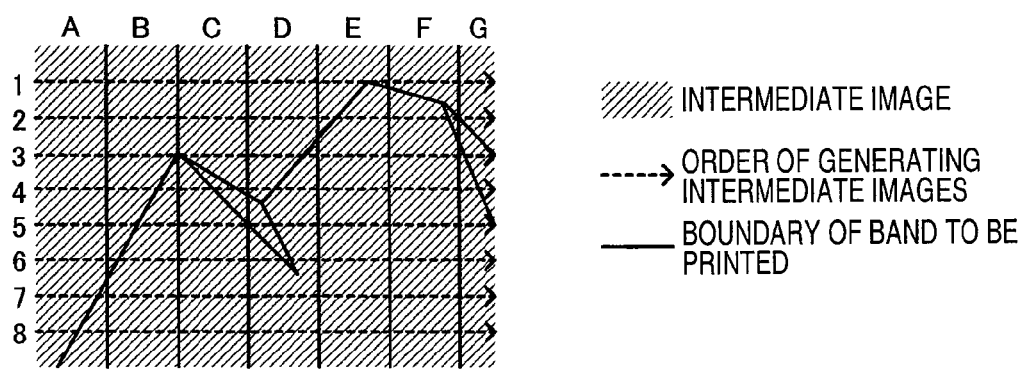
FIG. 6 is a typical view of an embodiment according to the invention.

For example, as shown in FIG. 6, when a horizontally long image is printed sequentially in the horizontal direction of the image (in the direction where the band to be printed is processed in the order starting from A to G), that is, when a 90-degree turned image is printed, the band to be printed is set in such a manner that the image is divided in the horizontal direction. In this case, as shown in FIG. 6, since the direction of generation of the intermediate image (the order according to which one line is generated in the horizontal direction in the order of a broken arrow mark, and the remaining lines are generated sequentially in the numerical order) is different 90 degrees from the direction of printing of the intermediate image (the order according to which the band to be printed is processed in the order of A to G), the generation of the intermediate image and the printing of the intermediate image cannot be processed sequentially in a serial manner. Therefore, in this case, it is necessary to hold the whole of the intermediate image statically in a memory space. Assuming that the intermediate image is held statically in a memory space without compressing the intermediate image, the RAM 14 must hold the whole of the intermediate image in a state in which the data size is shown by the whole of broken lines in S2 in FIG. 1.

In the printing operation, since the intermediate image serving as information about the source to be printed and the print data serving as output information must be held in the RAM 14, the necessary capacity of the RAM 14 is fairly large. For this reason, according to the present embodiment, by generating a compressed intermediate image, the memory resource is saved, which makes it possible to develop and print the RAW data in an environment having a limited memory resource. In addition, according to the present embodiment, since the compressed intermediate image is held by the removable memory 10, the capacity of the RAM 14 to be mounted in the printer 1 can be made substantially equal to that of a printer not adapted to the RAW data.

By the way, the above-mentioned effects are not limited only to the case where the image is rotated and printed. For example, even when the whole of the image is analyzed for setting the image correction control value, the effect provided by compressing the intermediate image can work advantageously. Also, for example, when the destination of the intermediate image is a device having a low data transfer speed such as a hard disk device, or when the communication speed between the printer 1 and an external device serving as the destination of the output thereof is low, the compression effect of the intermediate image can work advantageously.

In Step S302, the CPU 22, while reading therein the block data within the band to be printed sequentially from the removal memory 10, expands the block data and stores the resultant YCbCr image within the band to be printed into the RAM 14. As a result of this, the data of the band to be printed that are held by the RAM 14 provide a state shown in S7 in FIG. 7.

In Step S304, the CPU 22, while cooperating together with the image processing unit 16, corrects the image of the band to be printed. Specifically, there are executed a resolution conversion processing, a sharpness correction processing, a color balance correction processing, a tone correction processing, a memory color correction processing and the like to which the control values set in Step S300 are applied. At the then time, the data on the band to be printed that are held by the RAM 14 provide a state shown in S7 or S8 in FIG. 1 which is expressed by a color space corresponding to the contents of the processings. The sharpness correction processing is executed after conversion of the resolution and, as described above, there is applied a control value with the lowered sharpness due to the low pass filter of the image input apparatus such as a digital camera or the like taken into account. In this manner, according to the present embodiment, since a sharpness correction processing is not executed before conversion of the resolution, the quality of the printed image can be enhanced. The color balance correction processing, tone correction processing, memory color correction processing and the like may be carried out after or before the resolution conversion.

In Step S306, the CPU 22 generates the print data on the band to be printed from the image of the band to be printed, while the print unit 18 carries out a printing operation based on the print data. At the then time, the print data on the band to be printed that are held by the RAM 14 provide a state shown in S9 in FIG. 1.

When the processings in Steps from S302 to S306 are completed up to the final band to be printed (when "Yes" is judged in Step S308), the CPU 22 allows the RMC 12 to remove the intermediate image held in the removable memory 10 (Step S310). To remove the intermediate image after printing can prevent the useless consumption of the storage area of the removable memory 10 by the intermediate image that is generated regardless of the intention of the user. By the way, when the number of paper to be printed is two or more, the intermediate image may be held by the removable memory 10 until the printing of all the number of paper is completed or the generation and removal of the intermediate image may be repeated every time one copy is printed.

In a printer according to an embodiment of the invention which has been described heretofore, by storing the image generated from the RAW data into the removable memory 10, the image can be printed from the RAW data without increasing the capacity of the RAM 14. Therefore, the image can be printed from the RAW data without increasing production cost and development cost.

3. Other Embodiments

In the above-mentioned free capacity securing processing, description has been given of an example in which, when the free capacity of the removable memory 10 is short, the file removal menu 33 is displayed to thereby secure the free capacity. However, alternatively, addition of another removable memory may be requested of the user. Specifically, for example, as shown in FIG. 8 (E), the printer 1 may display on the FPD 27 a message telling that "The free capacity of the removable memory is short. You are requested to add another removable memory having an empty capacity of 1.2 MB bytes or more.", or may output the sound of the same contents. The term "1.2 MB bytes" in the message is the data size of the intermediate image that can be estimated from the RAW data selected at the then time. When this message is displayed, the user replaces the currently used removable memory with another removable memory having an empty capacity of 1.2 MB bytes or more and, in a state where the message is being displayed, depresses a given button provided on the operation unit 26. In response to this, the printer 1 repeats the processings in Step S100 and in the following steps and executes the free capacity securing processing to thereby confirm the free capacity of the removable memory. When the free capacity is sufficient, the removable memory substituted provides the destination of the intermediate image. When the replacement of the removable memory is rejected, the printer 1 executes an error processing.

Also, when two or more external storage mediums, which are not limited to the removable memories, can be connected to the printer 1, the free capacity of the respective external storage mediums may be checked and an intermediate image may be stored in each of the external storage mediums the free capacity of which is equal to or larger than the data size of the intermediate image. For example, as shown in FIG. 2, it is assumed that a digital camera 30, a personal computer 32 and a portable telephone 34 are connected to the printer 1 as external storage mediums. Also, it is assumed that two or more removable memories can be connected to the RMC 12 of the printer 1 and a hard disk (not shown) is built in the printer 1. In this case, the printer 1 checks these external storage mediums for their free capacity in a given order. The checking order can be set arbitrarily but, preferably, the external storage mediums such as the removable memories and built-in hard disk directly connected to the printer 1 may be checked first. When there is found an external storage medium having free capacity equal to or larger than the data size of the intermediate image, the thus found external storage medium provides the output destination of the intermediate image. In this manner, when the printer 1 is structured such that it can find out an external storage medium having free capacity equal to or larger than the data size of the intermediate image, the printing operation can be carried out continuously without troubling the user, thereby being able to further enhance the efficiency of the printing operation when printing the RAW data. When there has not been found out any external storage medium having free capacity equal to or larger than the data size of the intermediate image after all, the printer 1 may display the file removal menu 33, or may request the replacement of the removable memory, or may cancel the printing operation.

In the above-mentioned embodiments, description has been given of an example in which the intermediate image is output to the outside of the printer 1 but, as has been already described, the whole of the intermediate images may be held in the RAM 14 serving as a storage medium. Even in this case, by compressing the intermediate images, it is possible to reduce the capacity that is additionally necessary in the RAM 14 to print the image from the RAW data.

Also, in the above-mentioned embodiment, description has been given heretofore of an example in which the invention is applied to a printer of a stand-alone type. However, the invention can also applied to a PC (Personal Computer), a digital camera, an image scanner and the like respectively not having a function to correct an image. Specifically, the PC and image input apparatus can execute processings up to the above-mentioned RAW data processing and also can output a file in which an intermediate image obtained as the result of the execution of the processings and the correction control information of the image for obtaining a desirable print result are stored. In this case, preferably, the format of the correction control information and output file format may correspond to a general-purpose standard such as PIM, EXIF and Ver2.2.

The invention claimed is:

1. A printer, comprising:
an input unit configured to input first image data of a general purpose format from a source external to the printer;
an image generating unit configured to generate second image data of the general purpose format from RAW data input by the input unit, using a demosaicing processing; and
a print unit configured to print the first image data and configured to print the second image data,
wherein the general purpose format of the first image data is the same as the general purpose format of the second image data, and
wherein the first image data of the general purpose format is different from the RAW data.

2. The printer as set forth in claim 1, wherein the first image data is a first image file and the second image data is a second image file.

3. A printing method, comprising:
inputting first image data of a general purpose format to a printer from a source external to the printer;
inputting RAW data to the printer;
generating second image data of the general purpose format from the RAW data, using a demosaicing processing in the printer;
printing the first image data by the printer; and
printing the second image data by the printer,
wherein the general purpose format of the first image data is the same as the general purpose format of the second image data, and
wherein the first image data of the general purpose format is different from the RAW data.

4. The printing method as set forth in claim 3, wherein the first image data is a first image file and the second image data is a second image file.

5. The printer as set forth in claim 1, wherein the general purpose format is a JPEG format.

6. The printer as set forth in claim 1, wherein the image generating unit is configured to generate compressed image data from the RAW data and to analyze the compressed image data to set an image correction control value.

7. The printing method as set forth in claim 3, wherein the general purpose format is a JPEG format.

8. The printing method as set forth in claim 3, further comprising:
    generating compressed image data from the RAW data; and
    analyzing the compressed image data to set an image correction control value.

9. A printer, comprising:
    an input unit configured to input first image data of a general purpose format from a source external to the printer;
    an image generating unit configured to generate second image data of the general purpose format from RAW data input by the input unit, using a RAW development processing; and
    a print unit configured to print the first image data and configured to print the second image data,
    wherein the general purpose format of the first image data is the same as the general purpose format of the second image data, and
    wherein the first image data of the general purpose format is different from the RAW data.

10. The printer as set forth in claim 9, wherein the general purpose format is a JPEG format.

11. The printer as set forth in claim 9, wherein the image generating unit is configured to generate compressed image data from the RAW data and to analyze the compressed image data to set an image correction control value.

* * * * *